Figure 1:
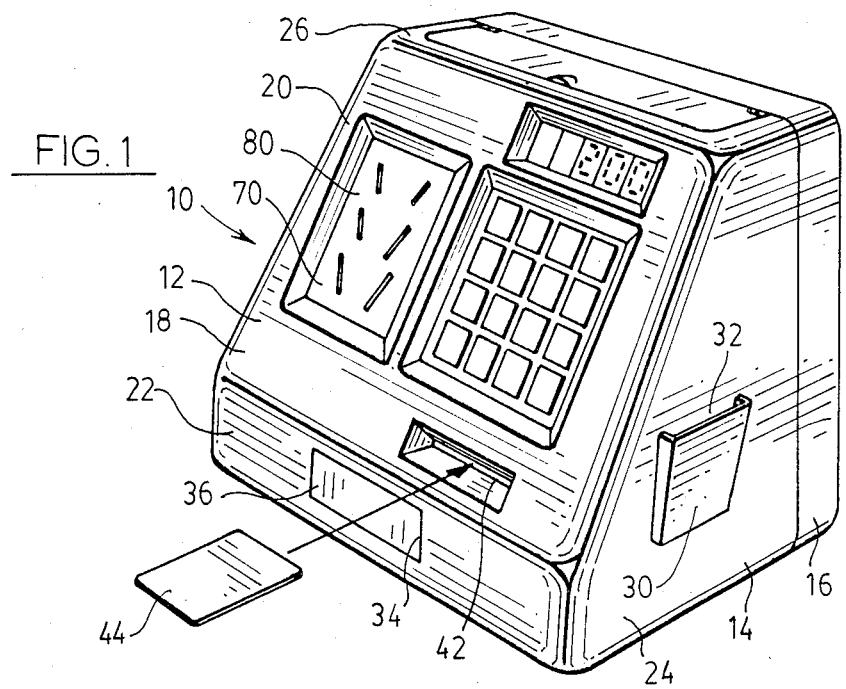

United States Patent [19]

Gotman et al.

[11] Patent Number: 4,811,828
[45] Date of Patent: Mar. 14, 1989

[54] SAVINGS BANK

[76] Inventors: Linda Gotman; Nickolas K. Gotman, both of 2056 Barsuda Drive, Unit #30, Mississauga, Ontario L5J 1V8, Canada

[21] Appl. No.: 39,024

[22] Filed: Apr. 16, 1987

[51] Int. Cl.⁴ .............................................. A45C 1/12
[52] U.S. Cl. ........................................ 194/351; 446/13
[58] Field of Search ............... 194/351, 217, 216, 215; 453/32, 58; 377/7; 232/4 R, 4 D, 65, 66; 446/8, 13

[56] References Cited

U.S. PATENT DOCUMENTS

| | | | |
|---|---|---|---|
| Re. 29,796 | 10/1978 | Yamamoto et al. | 194/351 X |
| Re. 32,115 | 4/1986 | Lockwood et al. | 194/217 X |
| 1,259,605 | 3/1918 | Copeland | 194/351 X |
| 2,267,857 | 12/1941 | Dietrich | 194/351 X |
| 3,792,764 | 2/1974 | Kinoshita | 194/351 |
| 4,282,674 | 8/1981 | Hanson et al. | 446/8 X |
| 4,673,368 | 6/1987 | Bush | 232/4 R X |
| 4,682,288 | 7/1987 | Taipale et al. | 377/7 |

FOREIGN PATENT DOCUMENTS 0646000 10/1984 Switzerland ..................... 194/351

Primary Examiner—F. J. Bartuska
Attorney, Agent, or Firm—Fetherstonhaugh & Co.

[57] ABSTRACT

A savings bank having a plurality of coin slots opening through its front wall for admitting coins to its coin storage chamber. A coin barrier is located at each coin slot. An activator is provided for moving each barrier between a first position in which it is arranged to close its associated slot and a second position in which its associated slot is open. A control system is provided which communicate with the activators for controlling the movement of each barrier between its first and second positions. The control system being accessible to a user to permit the user to determine which of the coin slots is to be opened to admit a coin in use.

5 Claims, 4 Drawing Sheets

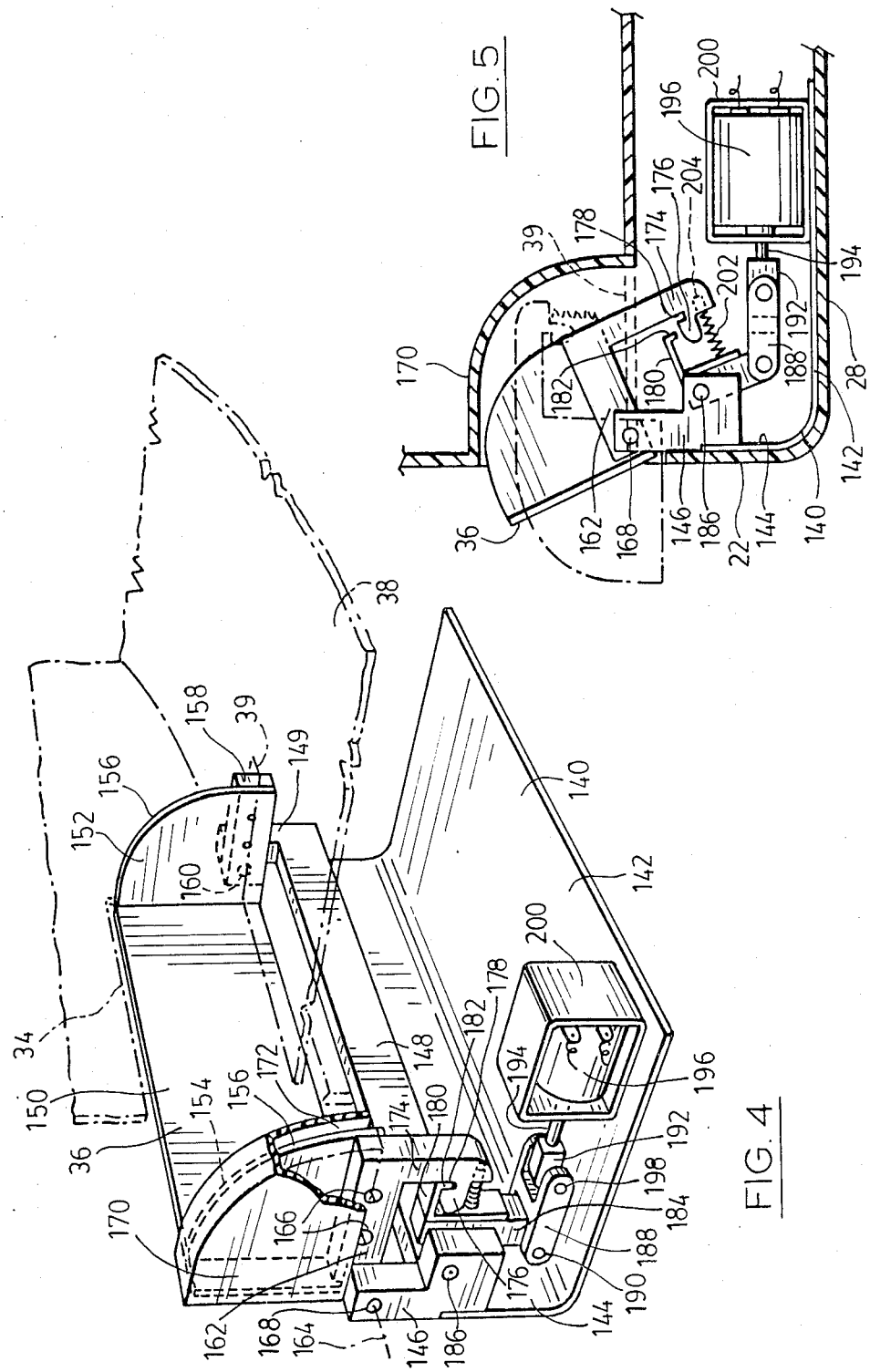

SAVINGS BANK

This invention relates to a savings bank. In particular, the invention relates to a savings bank which is educational and is designed to develop the skills of children in the use of banking machines.

Attempts have been made to provide children's savings banks which have a superficial appearance similar to that of the banking machines presently used by the public for the purposes of carrying banking transactions. These machines have, however, been simple devices employing mechanical mechanisms which do not function in a manner approaching that of a banking machine.

The mechanisms used in banking machines to ensure security and to communicate between the banking machine and a central control are so complex as to be quite inappropriate for use in a savings bank of the type of the present invention.

It is an object of the present invention to provide a portable savings bank which will simulate some of the functions of a banking machine but which is relatively inexpensive to manufacture.

It is a further object of the present invention to provide a savings bank which will only admit coinage corresponding to the value of the coinage entered by the user.

According to one aspect of the present invention, there is provided a savings bank which comprises a housing having a coin storage chamber formed therein, a plurality of coin slots opening through a front wall of said housing for admitting coins to said chamber, a plurality of coin barriers, one associated with each coin slot, activator means for moving each barrier between a first position in which it is arranged to close or block its associated slot and a second position in which its associated slot is open, control means communicating with said activator means for controlling the movement of each barrier between its first and second positions, said control means being accessible to a user to permit the user to determine which of the coin slots is to be opened to admit a coin in use.

According to a further aspect of the present invention, there is provided a savings bank which includes a control means which comprises a keyboard mounted on a wall of the housing such that its keys are accessible to a user, a display panel mounted on a wall of the housing such that it is visible to a user, computer means for receiving a signal from the keyboard which is indicative of the monetary value keyed into the keyboard by a user which is an indication of the value of the coinage to be admitted through one of said coin slots and being programmed to generate an output signal to activate the activator means of the coin slot which is adapted to admit the coinage corresponding in value to the monetary value keyed into the keyboard to move its associated barrier to its second position.

Figure 3:
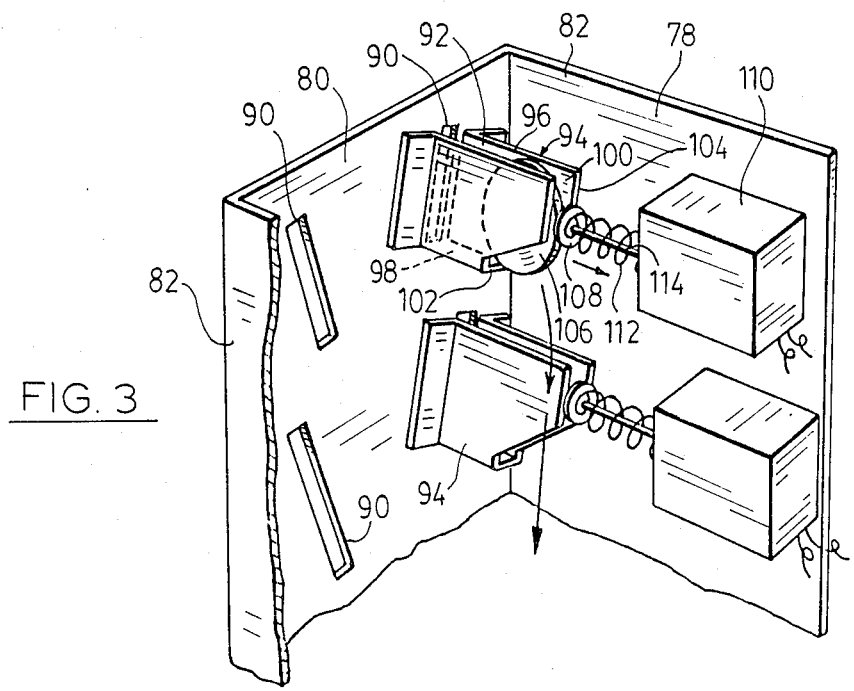
Figure 2:
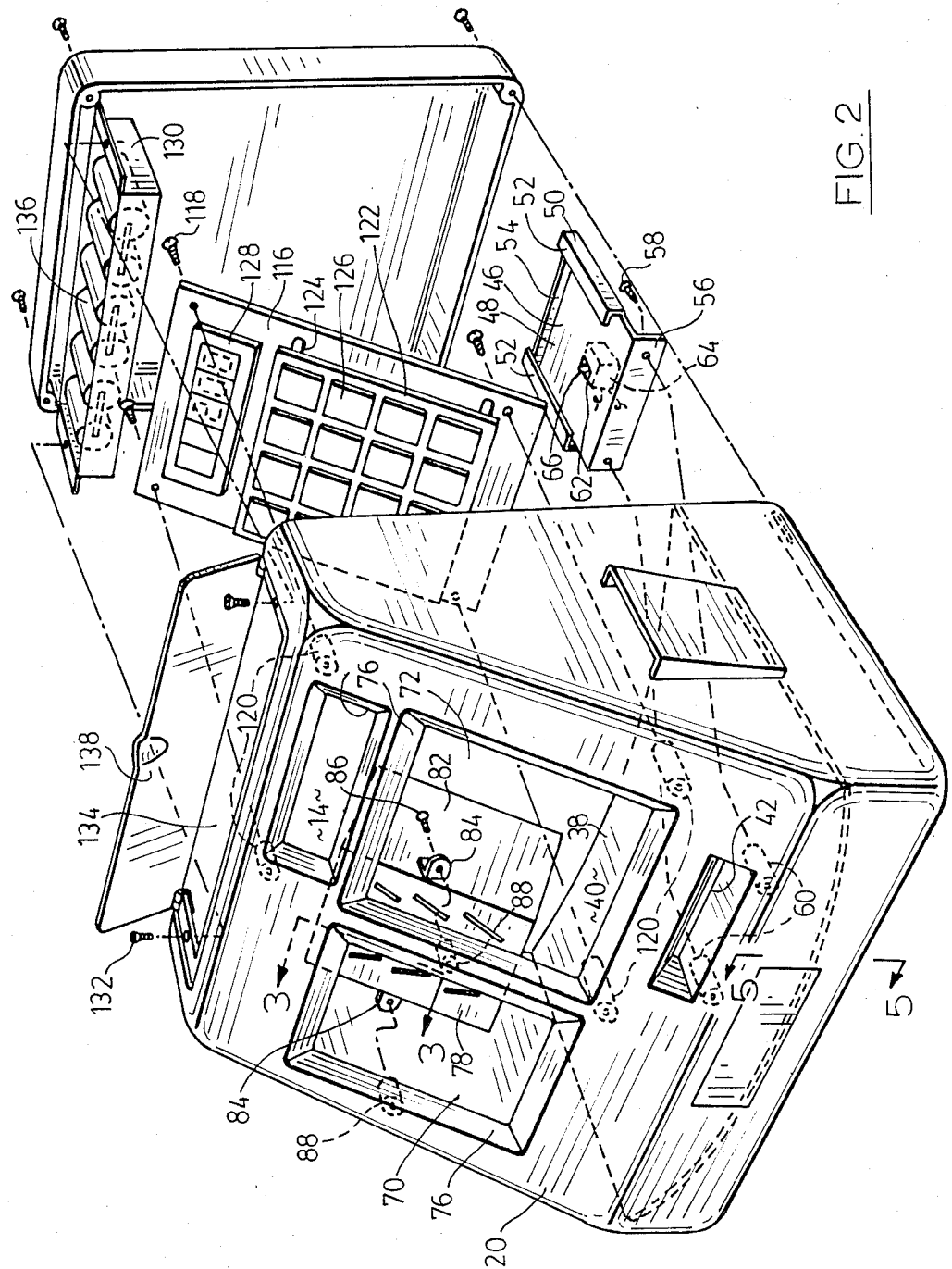

The invention will be more clearly understood after reference to the following detailed specification read in conjunction with the drawings wherein;

FIG. 1 is a pictorial view of a savings bank constructed in accordance with an embodiment of the present invention, FIG. 2 is an exploded view of the savings bank of FIG. 1, FIG. 3 is a view of a portion of the coin slot system taken in the direction of the arrows 2—2 of FIG. 2, FIG. 4 is a pictorial view of the gate used for closing the coin discharge passage, FIG. 5 is a sectional view of the gate of FIG. 4 taken along the line 5—5 of FIG. 2.

Figure 6:
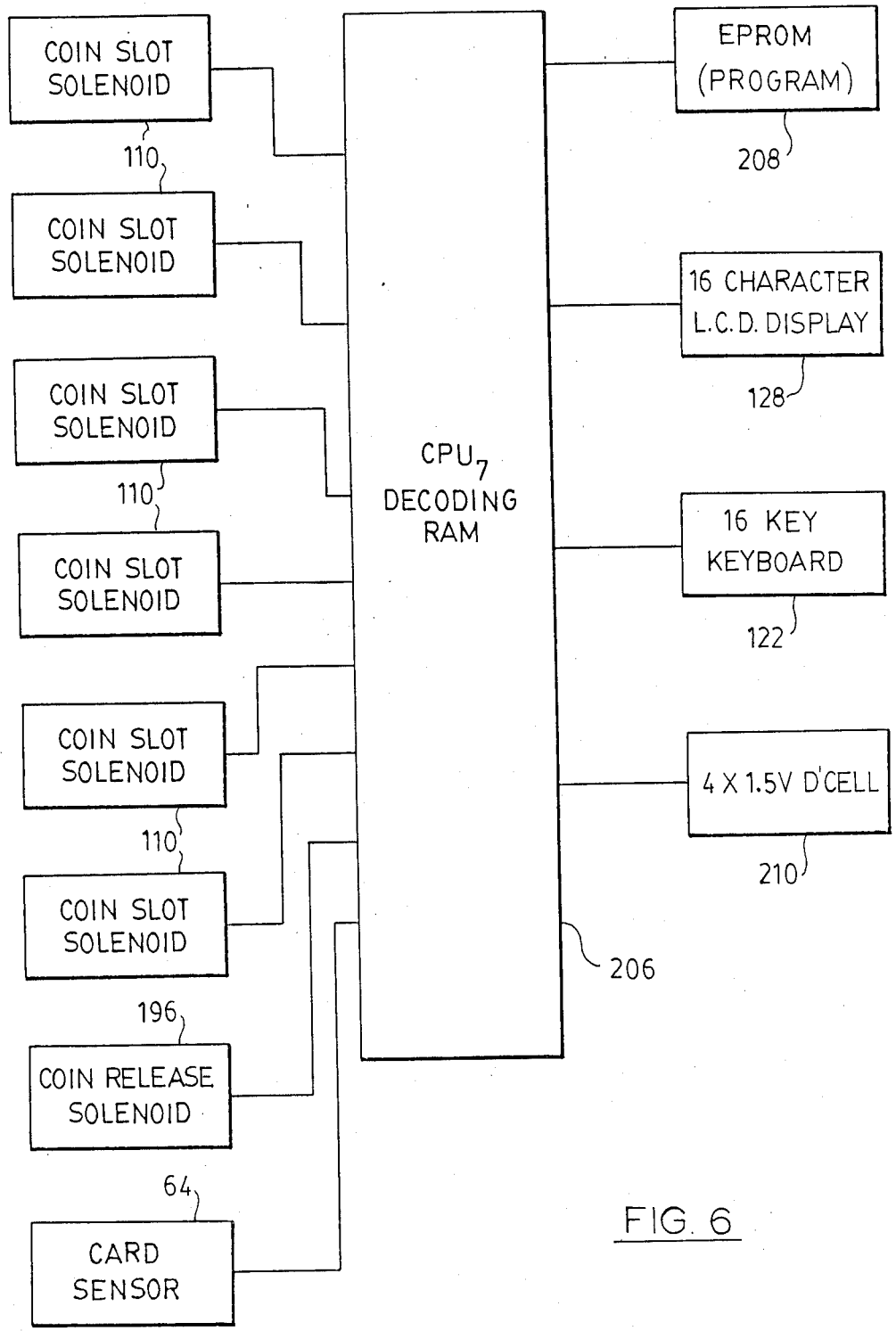

FIG. 6 is a block diagram illustrating the control system.

With reference to FIG. 1 of the drawings, the reference numeral 10 refers generally to a savings bank constructed in accordance with an embodiment of the present invention. The savings bank 10 has a housing 12 which is formed from a main enclosure 14 and a movable back wall panel 16. The main enclosure 14 has a front wall generally identified by the reference numeral 18 which includes an angularly inclined portion 20 and an upright portion 22. The main enclosure 14 also includes a pair of oppositely disposed side walls 24, a top wall 26 and a bottom wall 28 (FIG. 5).

A card retaining wall 30 is mounted on a side wall 24 and cooperates therewith to provide a card storage pocket 32.

A coin discharge passage 34 is formed in the upright portion 22 of the front wall and a door 36 is mounted in the opening 34. A wall 38 (FIG. 2) is located within the main enclosure 14 and serves to form the bottom wall of a coin storage chamber 40 formed within the housing 12. The wall 38 has a concave curvature and is shaped so as to direct coins which are supported thereon toward the discharge passage 34.

A card access slot 42 is formed in the angularly inclined portion 20 of the front wall and is proportioned to receive a card 44 which is of similar proportions to a conventional credit card. As shown in FIG. 2 of the drawings, a card receiving bracket 46 is provided for receiving a credit card. The bracket 46 includes a base plate 48 which has side rails 50 extending along opposite side edges thereof, each of which has a flange 52 which overlies an edge portion of the base plate 48 and serves to retain the card 44 closely adjacent the base plate 48. An end wall 54 extends upwardly from the base plate 48 and serves to form a stop for limiting the extent to which a card can be inserted into the slot 42. A flange 56 is located at the front end of the base plate 48 and mounting screws 58 are provided which extend through openings formed in the flange 56 to be threaded into 60 which are formed integrally with the front wall of the housing and serve to retain the card receiving bracket in a position in which the slipway formed therein is aligned with the slot 42. A passage 62 is formed in the base plate 48 and opens therethrough.

A switch 64 is mounted on the underside of the base plate 48 and has a switching arm 66 which projects through the passage 62 and will extend in a position above the plane of the base plate 48. The switching arm 66 is arranged to be moved between a first position and a second position in response to movement of the card 44 into and out of engagement with the switching arm.

Windows 70, 72 and 74 are formed in the inclined portion 20 of the front wall. The marginal edge portions 76 of the window openings 70, 72 and 74 are bevelled so that the openings 70, 72 and 74 are recessed with respect to the plane of the angularly inclined portion 20.

A coin slot bracket 78 is formed with a front wall 80 and a pair of oppositely disposed side walls 82 (FIG. 3). Lugs 84 (FIG. 2) are mounted on the side walls 82. Mounting screws 86 are provided for securing the lugs 84 to threaded passages formed in the bosses 88 which are formed integrally with the front wall 18 of the housing so as to secure the front wall 80 in a position closing the window 70. A plurality of coin slots 90 are formed in the front wall 80 and extend therethrough. The coin slots 90 are proportioned to permit coins of different sizes to pass therethrough. A coin chute 94 is formed with a pair of oppositely disposed side walls 96 and a bottom wall 98 arranged to define a coin receiving compartment 100. The inner edge 102 of the bottom wall 98 is spaced from the inner edges 104 of the side walls 94 by a distance which is less than the diameter of the coin 106 which is to be admitted through the associated slot 90.

A coin barrier 108 is provided at the inner end of each slipway 92. The barrier 108 is in the form of a disc which when located in the position shown in FIG. 3 of the drawings serves to retain the coin 106 in the holding compartment 100. An activator 110 is associated with each slot 90 and is in the form of an electrically operated solenoid which has a ram 112 which supports the barrier 108. A light weight return spring 114 serves to normally urge the ram toward the extended position. When the activator solenoid 110 is powered as will be described hereinafter, the ram is retracted in a direction of the arrow shown in FIG. 3 to an extent sufficient to displace the barrier 108 to an extent sufficient to permit the coin 104 to fall freely from the coin receiving compartment. The actuators 110 are mounted on the adjacent side walls 82 of the coin slot bracket 78.

The coin slots 90 are angularly inclined so that coins falling from the upper coin receiving compartments will not foul the coin receiving compartments located therebelow.

A board 116 is mounted by means of mounting screws 118 on bosses 120 formed on the inner face of the inclined wall portion 20 so as to be spaced rearwardly from the window 72. A keyboard 122 is mounted on the board 116 by means of support posts 124 and are spaced from the board 116 so as to be located in the window 72. A plurality of key pads 126 are located on the keyboard 122 in a configuration customarily used in a conventional pocket calculator. A display panel 128 is mounted on the board 116 and is arranged to be visible through the window 74. The display panel 128 may be in the form of a conventional LCD panel of the type commonly used in pocket calculators.

A battery storage tray 130 is mounted by means of mounting screws 132 in a position underlying the passageway 134 which is formed in the top wall 26. The tray 130 is proportioned to accommodate a plurality of batteries 136 which provide the power source for the control means and all of the powered equipment used in association with the savings bank. A door 138 is hingedly mounted on the housing so as to be movable between the closed position shown in FIG. 1 and the opened position shown in FIG. 2. When the door 138 is in the opened position, batteries 136 can be positioned in the tray 130.

The door 36 which is used for opening and closing the coin discharge passage 34 will now be described with reference to FIGS. 4 and 5 of the drawings.

As shown in FIGS. 4 and 5 of the drawings, an L-shaped base plate 140 is provided for supporting the door assembly. The L-shaped plate 140 has a horizontal portion 142 which extends in a face-to-face relationship with the bottom wall 28 of the housing and an upright portion 144 which extends in a face-to-face relationship with respect to the upright portion 22 of the front wall of the housing. A bracket 146 is located one side of the upright portion 144. A bridge plate 148 extends transversely of the upright portion 144 from the bracket 146 to the opposite side edge of the upright portion 144. The door 36 has a rectangular front panel 150 and a pair of oppositely disposed side wall panels 152 and 154. The side panels 152 and 154 each have an arcuate-shaped edge 156. A block 158 is mounted on the outer face of the side wall 152. A pivot pin 160 is mounted in the block 158 and in the upright post 149 which is located at the adjacent end of the bridge plate 148. A latching block 162 is mounted on the side wall 154 by means of mounting screws 166. A pivot pin 168 extends between the bracket 146 and the latching bracket 162 so that the door 36 can be pivoted between the closed position shown in FIG. 4 and the opened position shown in broken lines in FIG. 5 by rotation about the axis of the pivot pins 160 and 168. It will be noted that the axis 164 of the pivot pins 160 and 168 is located in the plane of the upper face of the bottom wall 38. Notches 39 are formed in the bottom wall 38 to accommodate the side walls 152 and 154. An arcuate-shaped cover 170 (only one of which is shown) extends over the side walls 152 and 154 and serves to close the slots 39 to prevent coins discharging through these slots when the door 36 is in the opened position. The covers 170 each have an arcuate-shaped passageway 172 which permits free movement of the side walls 152 and 154 and their associated mounting brackets.

The latching block 162 includes a leg portion 174 which has a lug 176 formed thereon and a slot 178 located between the lug 176 and the arm 174. A latching plate 180 is formed with a detent 182 proportioned to fit in a close-fitting relationship within the slot 178. The latching plate 180 is mounted on an arm 184 which is pivotally mounted on the bracket 146 by means of a pivot pin 186. An H-shaped link 188 is pivotally connected to the link arm 184 by means of a pivot pin 190. The H-shaped link 188 is pivotally connected to the head 192 of a ram 194 of a solenoid 196 by menas of a pivot pin 198. The solenoid 196 is mounted in a support frame 200 which is secured with respect to the horizontal portion 142 of the L-shaped plate 140. A compression spring 202 has one end mounted in a recess 204 which is formed in the arm 174. The other end of the compression spring 202 is arranged to bear against the latching plate 180.

When the door 36 is located in the closed position shown in FIG. 4 of the drawings and the solenoid 196 is activated, the ram 192 will be drawn inwardly and this will cause the arm 184 to pivot about the pivot pin 174. This movement of the arm 184 will cause the detent 182 of the latch plate 180 to be withdrawn from the slot 178. The compression spring 202 will then urge the door 36 to the partially opened position shown in solid lines in FIG. 5. In this position, the door 36 can be manually engaged so as to be opened to the position shown in broken lines in FIG. 5. Coins which are located within the coin storage chamber can then be removed through the coin discharge opening 34. The signal which is used to activate the solenoid 196 is of a short duration and is only required to perform the step of removing the detent 182 from the slot 178. It follows that almost immediately after the door has been unlatched, the solenoid 196 is deactivated to return the ram 194 to the position shown in FIG. 4 of the drawings. The door 36 can be latched in the closed position shown in FIG. 4 by merely manually pivoting the door to the closed position. The pressure applied by the spring 202 to the latch plate 180 will have the effect of driving the detent 182 into the blocking slot 178 in order to relock the door 36 in the closed position.

FIG. 6 of the drawings in a block diagram illustrating the control system.

The control system includes a central processing unit (CPU) 206. A suitable CPU is a Motorola MC146805E2 CPU manufactured by Motorola Inc. which has adequate decoding and ram capacity. The CPU communicates with the 16-key keyboard 122 to receive input signals therefrom. An eprom 208 such as a 27C-16 is programmed with a suitable program for controlling the operation of the CPU. A primary power source 210 which may be in the form of 4 or 6 1.5 volt D cell batteries is provided for the purposes of powering the CPU. A back-up power source 212 is provided for powering the CPU to provide memory retention capabilities. The CPU communicates with each of the coin slot solenoids 110. The CPU also communicates with the door opening solenoid 196, and card sensing switch 64.

Appropriate markings will be provided on the front wall 80 adjacent each coin slot to identify the coin which each slot is proportioned to accommodate. The slots 90 may be proportioned to accommodate coins such as a dime, a 1-cent piece, a nickel, a quarter, a 50-cent piece and a one-dollar coin or the coinage of any other monetary system in which the size of the coin is related to the monetary value of the coin.

In use, the appropriate coin is inserted into the corresponding slots. The coin will be retained in the coin storage compartment and will not be released into the coin storage chamber until a key-pad or combination of key-pads are present in order to register on the display a monetary value corresponding to the value of the coin located in the coin-retaining compartment. The CPU will then activate the appropriate solenoid 110 to move it up to the open position to permit the coin which is located in the corresponding storage compartment to fall freely into the coin storage chamber. This process can be repeated so as to deposite a plurality of coins of the same or different monetary value through their appropriate slots. To activate the CPU, the card 44 must first be inserted into the slot 42 to the point where it moves the switch arm 66 to the position closing the switch 62 to activate the system. The system will remain activated while the card 44 remains in the slot 42 in the position retaining the switch 62 in its closed position.

Various modifications of the savings bank of the present invention will be apparent to those skilled in the art without departing from the scope of the invention.

For example, covers may be provided over the coin chutes 94 to prevent the coins which have dropped from above passing into the underlying chutes. In addition, sensors may be provided in the coin storage chamber for indicating when the coin storage chamber is full or has been filled to the maximum desired extent. The additional sensors may communicate with the CPU to generate a signal which can be displayed on the display indicating that the coin storage chamber is full.

In a further modification, the barriers which close the coin slots may be mounted for movement transversely of the slipways 92 by arranging the solenoids at right angles to the slipways 92. In addition, the coin slots 90 may be vertically oriented. These and other modifications of the present invention will be apparent to those skilled in the art.

We claim:

1. A child's savings bank comprising;
   (a) a housing having a coin storage chamber formed therein,
   (b) a plurality of coin slots opening through a front wall of said housing for admitting coins to said chamber,
   (c) a plurality of coin barriers, one associated with each coin slot,
   (d) activator means for moving each barrier between a first position in which it is arranged to close its associated slot and a second position in which its associated slot is open,
   (e) input signal control means having a plurality of manually operable input switches which are selectively operable to establish communications between the control means and any one of said activators, said input switches being located on said housing at a point remote from said coin slots and requiring the exercise of selection skill on the part of the operator to select the switch or switches which must be manipulated in order to control the operation of the activator which must be activated to open a coin slot through which a particular coin may be admitted to the coin storage chamber,
   (f) a keyboard mounted on a wall of the housing such that its keys are accessible to a user, said keys serving to operate said input switches,
   (g) a display panel mounted on a wall of the housing such that it is visible to a user,
   (h) computer means for receiving a signal from the keyboard which is indicative of the monetary value keyed into the keyboard by a user which is an indication of the value of the coinage to be admitted through one of said coin slots and serving to generate an output signal to activate the activator means of the coin slot which is adapted to admit the coinage corresponding in value to the monetary value keyed into the keyboard to move its associated barrier to its second position.

2. A savings bank as claimed in claim 1, further comprising a switch for selectively activating and deactivating said control means, said switch being located in said housing so as to be inaccessible to direct contact by the user, an access slot opening into said housing at a point which is remote from said coin slots and communicating with said switch to permit a card to gain access to said switch to activate said switch when the card is located in a predetermined position within said access slot in use.

3. A savings bank as claimed in claim 1, further comprising a discharge passage communicating with said chamber, a door in said discharge passage which can be opened or closed to permit or prevent the discharge of coins from said chamber, latch means in said housing for releasably retaining said door in said closed position, said latch means communicating with said input signal control means so as to be operable in response to the manual operation of one or more of said manually operated input switches to release said latch to permit said door to open as required in use.

4. A savings bank as claimed in claim 1, wherein said coin slots are each proportioned to pass a coin of a different size.

5. A savings bank as claimed in claim 1, wherein a coin chute is associated with each coin slot, each coin chute having an open upper end and extends inwardly and downwardly within said chamber from its associated slot to form a holding compartment in which a coin may be retained within the housing by the barrier associated with the associated coin slot until said barrier is moved to its opened position.

* * * * *